Figure 1:
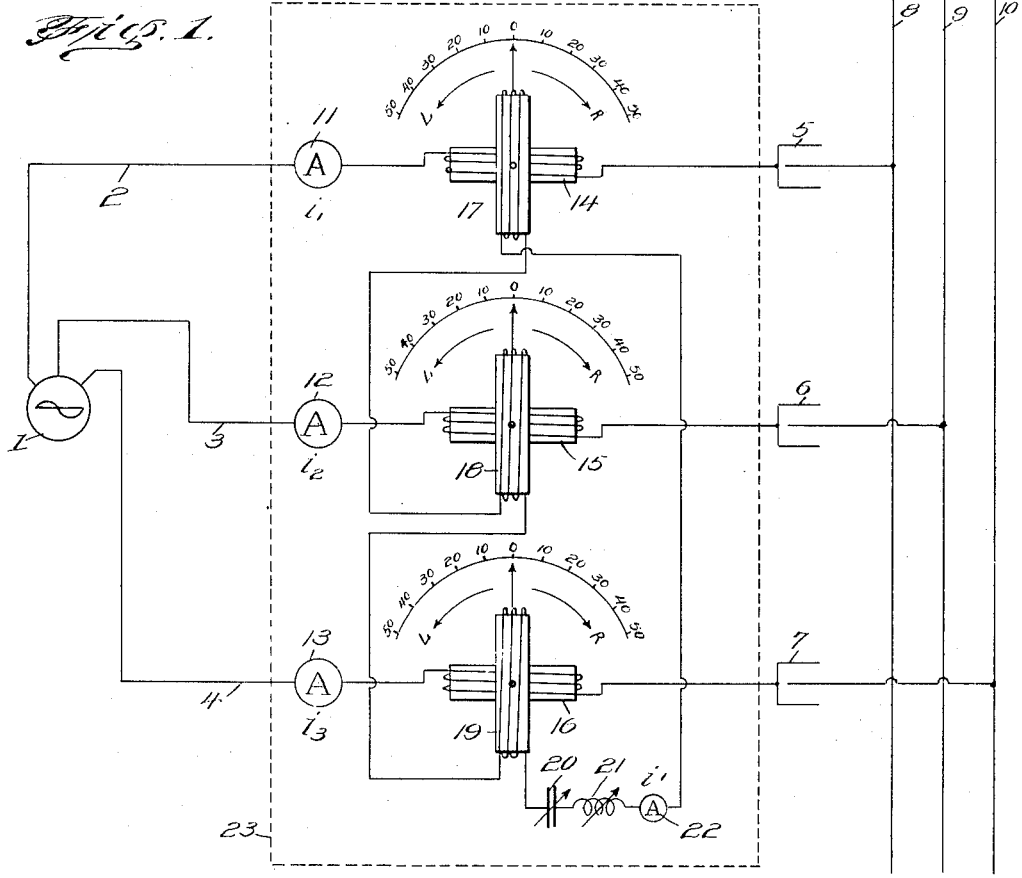

May 8, 1928.

R. D. DUNCAN, JR., ET AL 1,669,159

PHASE INDICATOR

Filed July 21, 1925

2 Sheets-Sheet 1

Inventor
Robert D. Duncan Jr.
Samuel Isler and
Salvatore A. Burone.

By John B. Brady
Attorney

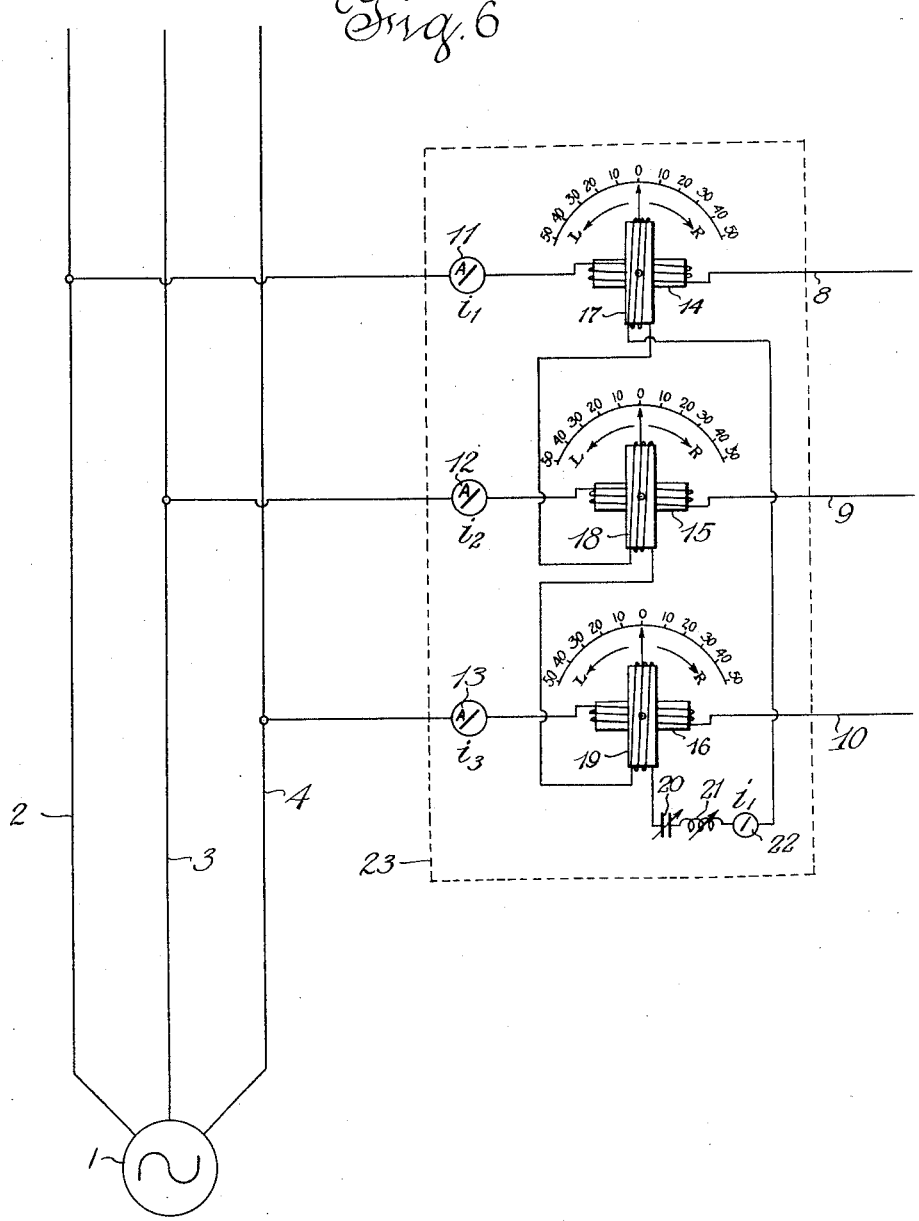

Patented May 8, 1928.

1,669,159

UNITED STATES PATENT OFFICE.

ROBERT D. DUNCAN, JR., OF EAST ORANGE, NEW JERSEY; SAMUEL ISLER, OF NEW BRIGHTON, AND SALVATORE A. BARONE, OF WINFIELD, NEW YORK, ASSIGNORS TO WIRED RADIO, INC., OF NEW YORK, N. Y., A CORPORATION OF DELAWARE.

PHASE INDICATOR.

Application filed July 21, 1925. Serial No. 45,132.

Our invention relates broadly to three phase high frequency electrical systems and more particularly to means for determining the phase angles between the three phase high frequency currents in the system.

One of the objects of our invention is to provide a method and circuit arrangement for the measurement of the phase angles between the currents of a three phase high frequency electrical current system at a point where the energy is impressed upon the line wire system.

Our invention has particular reference to the super-position of carrier currents on transmission lines for conveying intelligence over the transmission line wire system, while the transmission line is being employed for the conveying of power or energy utilized for other purposes. For the effective employment of a power line system for wired radio communication purposes the phase conditions of the high frequency currents in the transmission system must be accurately known.

In a three phase high frequency wired radio or carrier current system, such as is employed for communicating or broadcasting over three phase high voltage power transmission lines, it is desirable and at times necessary to have at hand a convenient means for determining the phase angles between the three high frequency currents as they enter the transmission line or between the three high frequency voltages impressed between the lines. Normally a transmission line is maintained in a balanced phase condition at the lower power frequencies, so that the current in the different phases at the receiving end and at all points along the line differ in time phase by substantially 120°. A low frequency line balance may or may not yield a balanced condition at the high wired radio frequencies, and under some conditions it may be necessary even to effect an unbalanced high frequency condition at the transmission end in order that the high frequency currents at a distance along the line differ in phase by 120°, a desirable condition from the standpoint of efficiency and of reduction of high frequency inductive and radiative interference.

In low frequency (60 cycle) work the phases of a three phase system may be and are tested by means of a voltmeter. Though high frequency voltmeters have been developed their practical use in addition to presenting a number of difficulties is by no means as cetrain, accurate and dependable as that of a low frequency instrument.

Our invention will be more fully understood from the following specification by reference to the accompanying drawings, wherein:

Figure 1 illustrates the circuit arrangement of the measuring apparatus of our invention connected between a source of three phase high frequency current and a power transmission line; Figs. 2, 3, 4, and 5 illustrate the vector relationship of the currents in the several phases of the high frequency system; and Fig. 6 shows the measuring apparatus of our invention connected in the transmission lines remote from the high frequency source.

Referring more particularly to Fig. 1 of the drawings, reference character 1 designates a source of three phase high frequency current operating into lines 2, 3, 4, which connect with the power transmission lines 8, 9, 10, through capacities 5, 6, 7. The function of the capacities is to provide a connection between the high frequency circuits and the high voltage power transmission lines and at the same time furnish a means of insulating these circuits from the lines. Generally the reactance of capacities 5, 6, 7 is so great at the power frequencies that no appreciable power current flows in lines 2, 3, 4. In series respectively with lines 2, 3, 4, are shown ammeters 11, 12, 13, and inductances 14, 15, 16. In the magnetic field of and inductively coupled to each of these latter are inductances 17, 18, 19 which are connected in series with each other, and with variable capacity 20, variable inductance 21, and ammeter 22. Capacity 20, and inductance 21 are employed for adjusting the circuit containing them to resonance for the frequency of source 1, but either or both may or may not be required, depending upon the circuit conditions. Inductances 17, 18, 19 are, as shown in Fig. 1, arranged to rotate around the line coils 14, 15, 16 so that the coupling between each of coil pairs 14—17, 15—18, and 16—19, may either be zero obtained with the coils at right angles or increased to a maximum value, obtained with each of the coil pairs in the same plane. It is obvious that the voltages induced in inductances 17, 18, 19 may be respectively either aiding or opposing, depending upon whether coils 17, 18, 19, are all set in the direction marked R, or whether one or two of them are set in the direction marked L. In Fig. 1 the outer coils are shown as revolvable. It is obvious that these could be fixed and the inner or line coils rotated instead.

As practically assembled, line coils 14, 15, 16 may be constituted by the stators of variometers, the rotors of which are formed by inductances 17, 18, 19. These units together with ammeters 11, 12, 13, and 22, capacity 20, and inductance 21 are conveniently assembled on a panel indicated by dotted line 23, and placed in the high frequency generating room so as to be under the control of the operator.

The theory of operation of the circuit will be more fully understood by reference to the vector diagrams of Figs. 2, 3, 4 and 5.

It is initially assumed that three equal high frequency currents $i_1$, $i_2$, $i_3$, are established in lines 2, 3, 4, the phases of which it is desired to determine. For the purposes of illustration these are shown vectorially in 120° relationship in Fig. 2. The coupling at transformer 14—17 is increased, say in direction R from zero to say 30 divisions on the scale, and the series circuit 17—18—19—20—21 adjusted so that a convenient current indication $i^1_1$ is obtained at ammeter 22. Coupling at 14—17 is then reduced to zero, and coupling at transformer 15—18 is increased also in the R direction until a current reading $i^1_2 = i^1_1$ is obtained at 22. Generally the division setting at 15—18 will be the same as at 14—17. With the coupling at 15—18 kept constant at this point, the coupling at 14—17 is again increased in the R direction to the 30 division mark and the resultant combined current $i^1$ at 22 noted. Knowing the values so obtained of $i^1_1$, $i^1_2$, $i^1$, the phase angle $\alpha$ between $i^1_1$ and $i^1_2$ may be computed. From the theory of alternating currents it is known that the three currents $i^1_1$, $i^1_2$ and $i^1$ may be represented vectorially as in Fig. 3 from which the phase angle $\alpha$ is obtained from the well known trigonometric relation $$(1) \quad \cos \alpha = \frac{i^{1^2} - (i^{1^2}_1 + i^{1^2}_2)}{2 i^1_1 i^1_2}$$

or rewritten $$(2) \quad i^{1^2} = i^{1^2}_1 + i^{1^2}_2 + 2 i^1_1 i^1_2 \cos \alpha$$

If the measurements show that $$i^1 = i^1_1 = i^1_2$$

then from (1)

$$\cos \alpha = -0.5$$

and $$\alpha = 120°$$

If with $i_1 = i_2$ as observed at ammeters 11 and 12, and with the adjustments at transformers 14—17 and 15—18 such that equal voltages are induced in coils 17, 18 obtained with the adjustments previously described, $i^1$ is not equal to $i^1_1$ or $i^1_2$, then the phase angle between currents $i_1$ and $i_2$ differs from 120°. In a similar manner the phase angles between $i_2$ and $i_3$, and $i_3$ and $i_1$ may be obtained, though knowledge of the phase angles between only two of the pairs of the currents $i_1$—$i_2$, $i_2$—$i_3$, $i_3$—$i_1$ is necessary as the three angles add up to 360°. By operating in the manner described on at least two pairs of the three currents the phase angles of the high frequency line currents may be measured.

Figure 4:
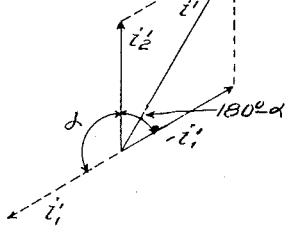

If now with coil 18 set in the L direction yielding a coupling such that the current indication at ammeter 22 is equal in value to that obtained with coil 17 set in the R direction as before, the condition exists as shown vectorially in Fig. 4, that is the voltage now induced in coil 18 is 180° out of phase with that previously induced therein. Under this condition $$(3) \quad \cos \alpha = \frac{i^{1^2}_1 + i^{1^2}_2 - i^{1^2}}{2 i^1_1 i^1_2}$$

or $$(4) \quad i^{1^2} = i^{1^2}_1 + i^{1^2}_2 - 2 i^1_1 i^1_2 \cos \alpha$$

if as before $\alpha = 120°$ and $i^1_1 = i^1_2$ $$i^1 = \sqrt{3} i^1_1 = \sqrt{3} i^1_2$$
$$= 1.732 \, i^1_1$$

The currents $i_1$, $i_2$, $i_3$, may again be tested by pairs.

Figure 3:
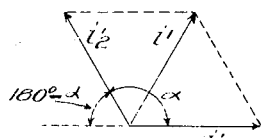
Figure 5:
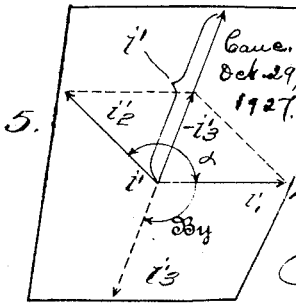

Figs. 3 and 4 have not been prepared in comparable angular relationships of the vectors as each is an independent representation of a different set of conditions existing in the phase measurement circuits. A third and fourth combination is possible in which the three currents $i_1$, $i_2$, $i_3$, are used simultaneously, one to obtain a finite reading at ammeter 22, and the other a zero reading. If rotor 19 be adjusted in the L direction such that the resulting coupling yields $i^1_3$ at 22 equal to the values of $i^1_1 = i^1_2$, obtained with the coupling of rotors 17, 18 in the R direction, the condition as shown in Fig. 5 exists, viz, $i^1_3$ is equal in magnitude to, but by virtue of the reversed coupling substantially coincides in phase with the vector resultant of $i^1_1$ and $i^1_2$, and hence if $\alpha = 120°$, $$i^1 = 2i^1_1 = 2i^1_2 = 2i^1_3$$

The condition of zero indication at ammeter 22 is obtained with rotors 17, 18, 19 all set in either the R or L directions such that individually $i^1_1 = i^1_2 = i^1_3$, in which case if $\alpha = 120°$, $i^1 = 0$.

It is possible to obtain an angular relationship between three vectors such that their vector sum equals zero, though the vectors themselves are displaced from each other by angles differing by 120°. However, if three vectors of equal amplitudes do differ in phase by 120° then their vector sum will also equal zero. This zero sum feature, mathematically speaking, therefore, is a necessary but not a sufficient condition, in that other vector arrangements may be obtained which will also yield the zero sum. However, the other relationships as illustrated in Figs. 3, 4 and 5 will yield certain values and these values only when the phase difference between the various vectors is 120°. These conditions are therefore both necessary and sufficient.

As noted previously, at times it is desirable to arbitrarily throw the currents $i_1$, $i_2$, $i_3$ at the generator out of the 120° phase relation in order to obtain this 120° relation between the currents in the transmission lines at some distance from the generator 1. The required amount of unbalancing at generator 1 having been determined, the proper indication of the ammeter 22 corresponding to the value of angle $\alpha$ different from 120° is obtained from either equations (2) or (4) and the proper adjustments of the generator made to obtain this.

Figure 2:
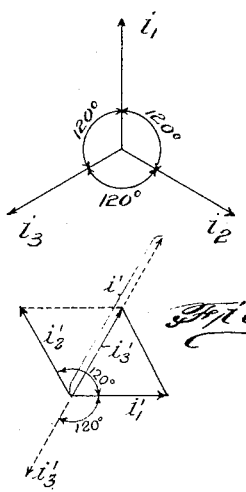

In Fig. 5 the vectors $i^1_1$, $i^1_2$ and $i^1_3$ represent the currents induced in the secondaries of transformers 14—17, 15—18 and 16—19 by the line currents flowing in the primaries. The line currents are assumed equal and displaced by 120° as shown in Fig. 2. The vector sum of $i^1_1$ and $i^1_2$ is obtained by setting the rotors or secondaries of transformers 14—17 and 15—18 in the same direction and to the extent to give equal values of $i^1_1$ and $i^1_2$ when taken singly. $i^1_1$ and $i^1_2$ will therefore also be displaced by 120°. Their vector sum will thus be a vector equal in length to either $i^1_1$ or $i^1_2$ and displaced from both by 60°, that is, coinciding in position with vector $-i^1_3$ of Fig. 5. By coupling the rotor of transformer 16—19 in a sense opposite to that of transformers 14—17 and 15—18, the induced current $i^1_3$ in the secondary is shifted 180° to position $-i^1_3$, thus adding directly to the vector sum of $i^1_1$ and $i^1_2$ to produce $i^1$ which is two times in length either of vectors $i^1_1$, $i^1_2$ or $i^1_3$. Vector $i^1_2$ and minus $i^1_3$ are shown displaced by 60°.

In Fig. 1 the phase measuring devices are indicated as being connected in the high frequency leads to the transmission lines and adjacent to the high frequency source. It is obvious that transformers 14—17, 15—18, and 16—19 with associated circuits may be connected in the transmission lines at any point such as represented for example in Fig. 6, the only requirement then being that the line coils 14, 15, 16 carry the low frequency power current.

While we have shown the load in the form of a transmission line it will be understood that any suitable type of load may be employed and that we intend no limitations upon the applications of our invention. Our invention may be employed as a measuring apparatus in any line independent of whether the superimposed carrier currents are used for signaling currents or for purposes of control in any other manner. We have shown our invention as applied to a three phase electrical system, but it will be observed that the principles of our invention are equally applicable to other polyphase systems.

We have illustrated the invention in a certain particular embodiment, but it is to be understood that modifications may be made within the scope of the appended claims without departing from the spirit of the invention.

Having thus described our invention, what we claim and desire to secure by Letters Patent of the United States is as follows:

1. In a three phase electrical system the combination with a source of three phase energy, a three phase transmission line, connections between said three phase source of energy and said three phase transmission line, an inductance in each of said connections, and means inductively coupled with said inductances for determining the phase angles between the three phase currents that enter the transmission line.

2. In a three phase electrical system the combination of a source of three phase energy, a three phase transmission line, connections for impressing said three phase energy upon said three phase transmission line, inductances interposed in said connections between said source of three phase energy and said three phase transmission line, and independent inductances variably coupled with said first mentioned inductances, a series circuit including said series circuit inductance and means in said series circuit for determining the phase angles of the currents in each of the phases of the three phase transmission line.

3. The combination of three inductances, a suitable means of support, said three inductances mounted adjacent each other and fixed in position on said means of support, three additional inductances, each of which is inductively coupled to one of said first mentioned inductances, and rotatable about an axis common to the fixed inductances and in the magnetic fields of one of said first mentioned inductances, said couplings being variable from zero to a maximum value by virtue of rotation of said additional inductances, the sense of said couplings being such that either collectively or individually they may be substantially zero, additive or in opposition, said additional inductances being electrically connected in series, and an ammeter connected in series and forming a closed circuit with said additional inductances, said combination providing a means for measuring the phase angles between the currents flowing through said first mentioned inductances.

4. The combination of three inductances, a suitable means of support, said three inductances mounted adjacent each other and fixed in position on said means of support, three additional inductances, each of which is inductively coupled to one of said first mentioned inductances and rotatable about an axis common to the fixed inductances and in the magnetic fields of one of said first mentioned inductances, said couplings being variable from zero to a maximum value by virtue of rotation of said additional inductances, the sense of said couplings being such that either collectively or individually they may be substantially zero, additive or in opposition, said first mentioned inductances being electrically connected in series, an ammeter mounted on said means of support, said ammeter being connected in series and forming a closed circuit with said additional inductances, said combination providing a means for measuring the phase angles between the currents flowing through said first mentioned inductances.

5. The combination of a plurality of inductance coils, a suitable means of support, said plurality of inductance coils mounted and fixed in position on said means of support, a plurality of additional inductance coils each of which is inductively coupled with one of said first mentioned inductance coils, said couplings being independently variable from zero to a maximum, one of said sets of inductance coils being electrically connected in series, an ammeter mounted on said means of support, said ammeter connected in series and forming a closed circuit with said series connected inductance coils, said combination providing a means for measuring the phase angles between currents traversing the remaining set of inductance coils.

6. In an apparatus for measuring the phase angles between alternating currents traversing a plurality of inductances, inductively coupled to each of which is one each of an additional plurality of inductances, said couplings being variable from substantially zero to a maximum in a positive and negative sense, said additional inductances being connected in series through an ammeter, the coupling of all but two of the sets of said first and additional inductances being maintained substantially zero at all times, the coupling between one of two remaining sets of inductances being adjustable in a positive or negative sense for a finite current indication on said ammeter with the coupling between another pair of said remaining inductances adjusted to zero, the coupling being adjustable in the same sense between said second pair of remaining inductances for the same finite current indication on said ammeter with the coupling between said first pair of remaining inductances adjusted to zero, the coupling between the two pairs of remaining inductances being adjustable in the same sense and to the degree which previously yielded individually equivalent current indications of said ammeter, said individual current indications, and resultant combined current indication providing means for determining the phase angles between at least two of the alternating currents traversing one set of said plurality of inductances.

7. In an apparatus for measuring the phase angles between alternating currents traversing a plurality of inductances, inductively coupled to each of which is one each of an additional plurality of inductances, said couplings being variable from substantially zero to a maximum in a positive and negative sense, said additional inductances being connected in series through an ammeter, the coupling of all but two of the sets of said first and additional inductances being maintained substantially zero at all times, the coupling between one of two remaining sets of inductances being adjustable in a positive or negative sense for a finite current indication on said ammeter with the coupling between another pair of said remaining inductances adjusted to zero, the coupling between the second pair of remaining inductances being adjustable in an opposite sense to that of said first pair, for the same finite current indication on said ammeter with the coupling between said first pair of remaining inductances adjusted to zero, the coupling between the two pairs of remaining inductances being adjustable, one in a positive and the other in a negative sense, and to a degree which previously yielded individually equivalent current indications on said ammeter, said individual current indications and resultant combined current indications providing means for determining the phase angles between at least two of the alternating currents traversing one set of said plurality of inductances.

8. In an apparatus for measuring the phase angles between alternating currents traversing three inductances, inductively coupled to each of which are three additional inductances, said couplings being variable from substantially zero to a maximum in a positive and negative sense, an ammeter, said additional inductances being connected in series through said ammeter, two pairs of said first and additional inductances being adjustable in the same sense to the degree which when individually adjusted yields the equivalent current indications on said ammeter and the coupling of the third pair of said first and additional inductances being adjustable in an opposite sense to that of said first and second pairs and to a degree which, when individually adjusted, yields a current indication on the said ammeter equal to said current indications obtained with said individual adjustments of the couplings between said first and second pairs of said first and additional inductances, the individual coupling adjustments obtained with the coupling of the two unused pairs of first mentioned and additional inductances being zero, said current indications of said ammeter providing a means for determining the phase angles between at least two of the currents traversing one set of said first three and additional inductances.

ROBERT D. DUNCAN, Jr.
SAMUEL ISLER.
SALVATORE A. BARONE.